R. A. WIGGINS.
MECHANISM OF MILKING MACHINES.
APPLICATION FILED APR. 16, 1909.

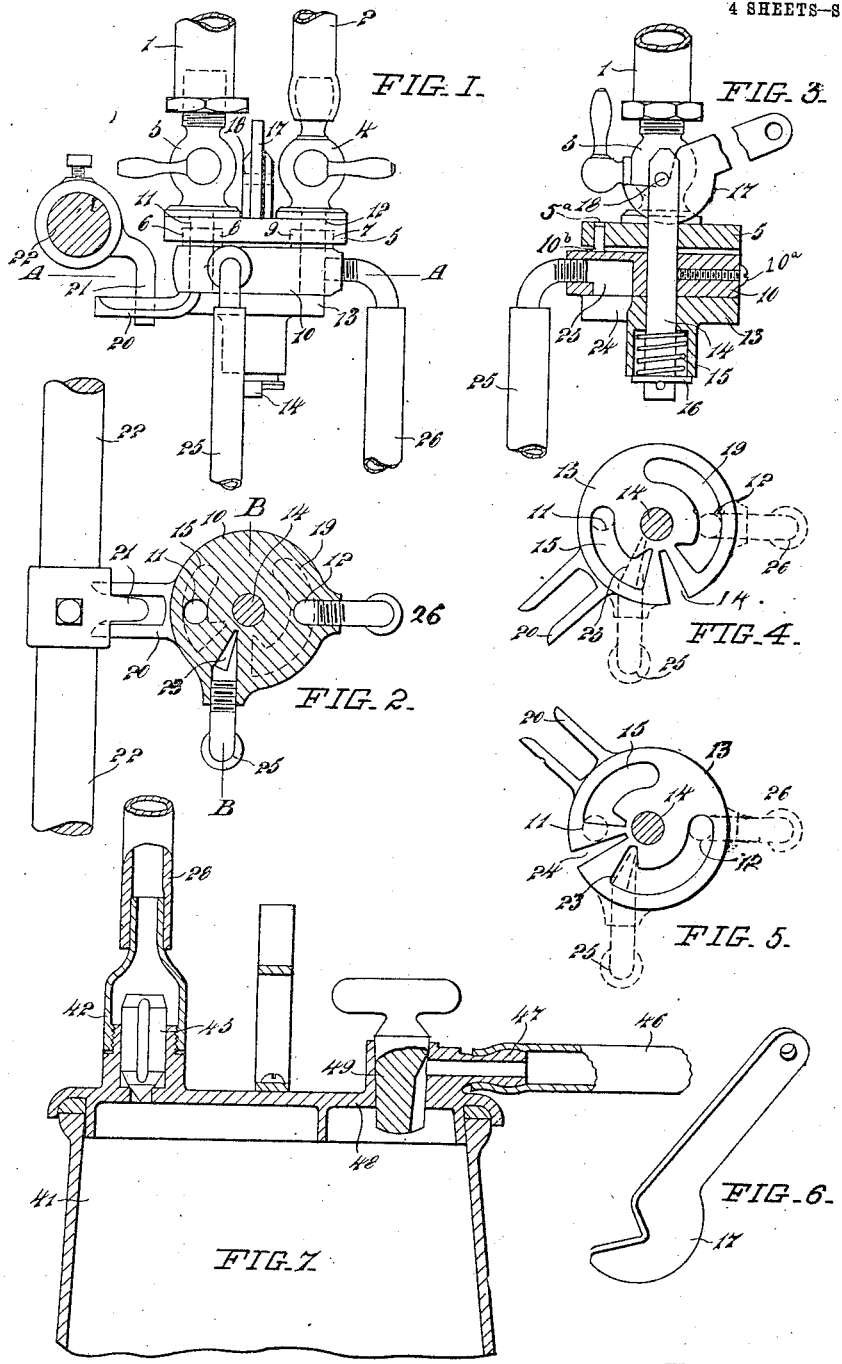

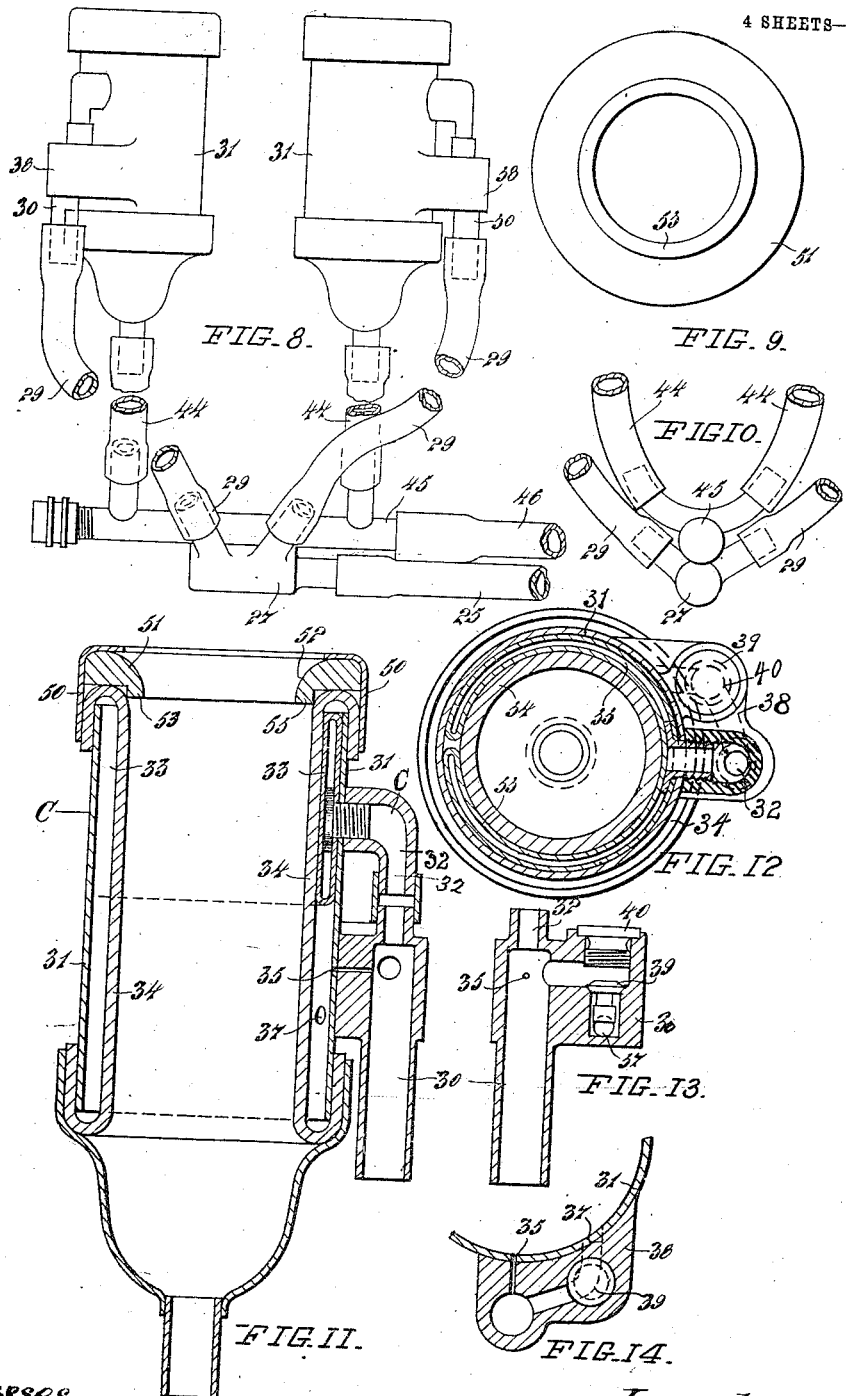

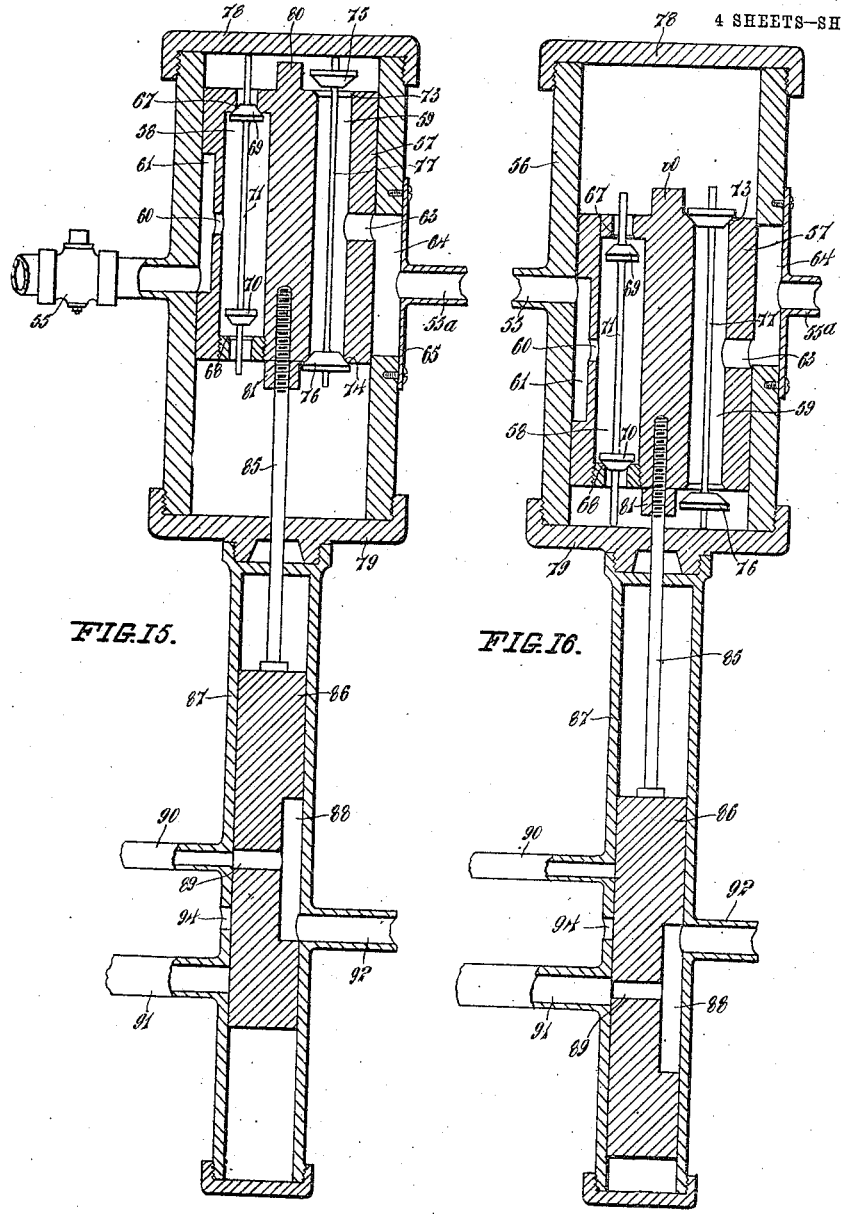

981,730.

Patented Jan. 17, 1911.
4 SHEETS—SHEET 4.

Witnesses

Robert Andrew Wiggins
Inventor
Attorneys.

UNITED STATES PATENT OFFICE.

ROBERT ANDREW WIGGINS, OF PALMERSTON NORTH, NEW ZEALAND.

MECHANISM OF MILKING-MACHINES.

981,730.

Specification of Letters Patent. Patented Jan. 17, 1911.

Application filed April 16, 1909. Serial No. 490,334.

*To all whom it may concern:*

Be it known that I, ROBERT ANDREW WIGGINS, a subject of His Majesty the King of Great Britain and Ireland, residing at Palmerston North, in the Dominion of New Zealand, have invented certain new and useful Improvements in Mechanism of Milking-Machines, of which the following is a specification.

This invention relates to that class of milking machines wherein air pressure is applied to the teats to express milk therefrom, and vacuum employed to retain the cups in position on the teats. According hereto air pressure and a vacuum are alternately applied to teat cups thereby imparting pulsations to the teats, the air pressure being reduced to atmospheric pressure before the air pressure is applied at each pulsation. A saving of energy results owing to the air pressure and vacuum being applied in each case when the air in the teat cups is at atmospheric pressure. This object of the invention is effected by allowing the air to shift at each pulsation and thereby break down the air pressure or the vacuum.

A further feature of the invention is to apply by means of a single pipe, air pressure to the upper part of the teat cup earlier than to the lower part thereof.

A detailed description of the mechanism will now be given by aid of the accompanying drawings wherein:—

Figure 11:
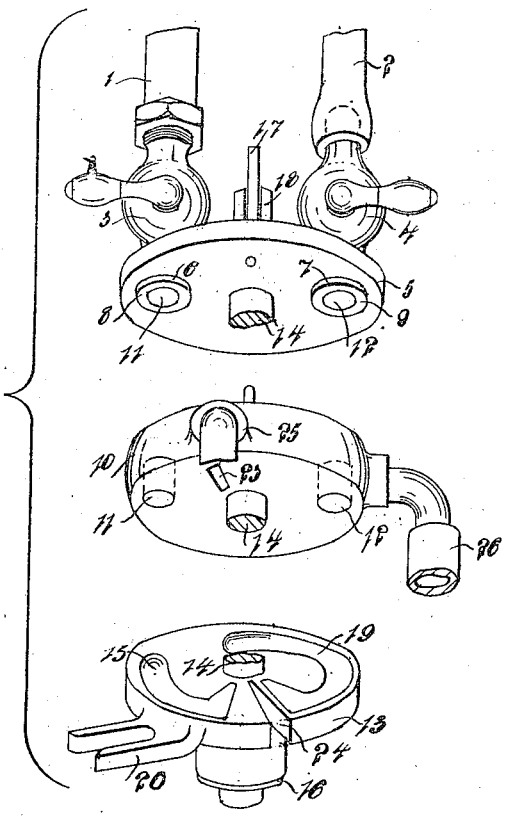
Figure 18:
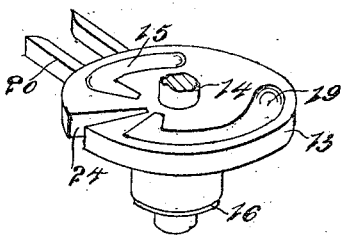

Figure 1, is a side elevation of the controller, Fig. 2, a sectional plan on line A—A, Fig. 1, Fig. 3, a sectional elevation on line B—B, showing in dotted lines the positions of pipes 25 and 26 and tubes 11 and 12 in relation to the grooves 15 and 19, Fig. 2, Fig. 4, a plan of a valve at one end of its stroke, Fig. 5, a similar plan of the valve at the opposite end of its stroke, Fig. 6, a perspective view of a keeper, Fig. 7, a sectional elevation of the top of a milk vessel and fittings, Fig. 8, a side elevation of teat cups and junction, Fig. 9, a plan of a teat cup cap, Fig. 10, an end elevation of a teat cup junction, Fig. 11, a sectional elevation of a teat cup, Fig. 12, a sectional plan on line C—C, Fig. 11, Fig. 13 a sectional elevation, Fig. 14, a sectional plan of an exhaust valve. Fig. 15, is a sectional elevation of a modified form of controller, and Fig. 16, is a similar view showing the operative parts in a different position. Fig. 17 represents detail perspective views of the plate 5, disk 10 and disk 13 conveniently separated, the spindle being broken away to permit such separation, the disk 13 being in the position indicated by Fig. 4; Fig. 18 represents a detail perspective view of disk 13 in the position indicated by Fig. 4.

Referring more particularly to Fig. 1, the pipe 1 is connected to any source from which air under pressure is obtained, as for example a vessel into which air is forced by a pump or blower, and the pipe 2 is in communication with another vessel in which a vacuum is formed. These pipes are connected to cocks 3 and 4 respectively, fixed in holes 11 and 12 passing through a plate 5 and said plate 10 (see Figs. 1 and 2), said plate 5 being provided with recesses 6 and 7 wherein washers of rubber 8 and 9 make an airtight joint between the said plate and a disk 10 which has an internally threaded hole, into which is turned a pointed screw $10^a$, and an integral pin $10^b$ on its top engaging a hole $5^a$ corresponding in diameter to the diameter of said pin in the plate 5.

A disk valve 13 mounted upon a spindle 14 passing through the center of the disk 10 and the plate 5 is held in operative position against the disk 10 by a spring in compression between a washer 16 on the spindle 14 and the valve 13; the upper end of the spindle being forked to receive a keeper 17 bearing upon the plate 5 and adapted to take beneath a pin 18 traversing the fork of the spindle. Said disk 10 is fastened on said spindle 14 by turning the screw $10^a$ in until it bites into the spindle and prevents the disk from slipping or turning. Said screw is aided in keeping plate 10 from turning by the pin $10^b$ above referred to. The valve 13 is readily removed by releasing the keeper from the fork and by withdrawing the spindle. A jaw 20 projecting from the circumference of the valve 13 is adapted to engage a detent 21 fixed to a reciprocating shaft 22. The disk 10 is traversed by an elongated port 23 and the valve 13 has a slot 24 corresponding in shape to the port 23, and has deep concentric grooves 15 and 19 communicating with the pipes 1 and 2. A pipe 25 communicates with the port 23 and a pipe 26 is in continuous communication with the vacuum pipe 2 through the hole 12. The pipe 25 passes to a teat cup junction 27 by which it is divided into four branch pipes 29, one for each teat cup.

Each branch pipe 29 is connected to a nozzle 30 integral with or fixed to the side of a teat cup casing 31 and connected by a large passage-way 32 to a pouch 3 surrounding the upper part only of the flexible lining 34 of the teat cup. The said nozzle 30 communicates with the space between the casing and the part of the lining 34 below the pouch 33 by a small hole 35. Air from the nozzle thus passes rapidly into the pouch 33 and more slowly into the lower part of the teat cup casing through the hole 35. The exhaust of air from the large passage-way 32 is sufficient to allow the pouch 33 to collapse rapidly, but as it is desired also to exhaust the air rapidly from the lower part of the teat cup the hole 35 is insufficient. A lateral port 37 is, therefore, provided and communicates with a valve chamber 38 below a non-return valve 39, access to which is obtained by means of a screw cap 40 (see Figs. 11, 13 and 14).

The pipe 26 (see Fig. 1) is connected to a milk vessel 41 (see Fig. 7) by a nipple 42 in which is located a non-return valve 43, and the interior of the teat cups are connected to the said vessel 41 by means of branch pipes 44 (see Fig. 8) leading to the junction 45 and by a pipe 46 connecting the junction to a nozzle 47 (see Fig. 7) provided upon the lid 48 of the milk vessel. The flow of milk through this nozzle 47 may be arrested or regulated by means of a cock 49.

The metal cap 50 (see Fig. 11) of the teat cup is of usual construction for holding the fold of the lining 34 airtight with the casing 31 and on the interior of this cap 8 is provided a rubber washer 51 of considerable thickness and having a curved inner face 52 for fitting closely against the udder at the top of the teat. A thin rim 53 at the termination of the curved face 52 grasps the teat during the operation of milking and assists in keeping the teat cup securely in position.

The operation of the apparatus is as follows:—Air under pressure is admitted to the pipe 25 through the groove 16 and port 23 when the valve 13 is at the end of its stroke as shown in Fig. 4. The air passes through the branch 29 into the nozzle 30 and passing rapidly through the passage-way 32 fills the pouch 33 at the top of the teat cup. The air passing more slowly through the small hole 35 fills the lower part of the teat cup more slowly with the effect that the milk is first expressed from the top of the teat and finally from the lower part thereof, thus completely emptying the teat at every pulsation. The valve 13 being then reciprocated in the direction shown by the arrow in Fig. 4 by the shaft 22, the groove 15 passes through beyond the port 23 thus cutting off the air pressure from the pipe 25 and the teat cups. The travel of the valve continuing, its slot 24 next communicates with the port 23 (see Fig. 3) allowing the air to escape therethrough from the pouch 33 through the passage-way 32 and from the lower part of the teat cup through the lateral port 37, lifting the valve 39 and finding its way into the nozzle 30 and branches 29 and pipe 25. The valve traveling still farther, the groove 19 next communicates with the port 23 thus opening communication between the pipe 25 and the pipe 2 thereby establishing communication between the pouch 33 and the lining 34 below the teat cup and vacuum pipe 2. The withdrawal of the flexible lining from the teat is thus effected rapidly and effectively.

Referring now to Figs. 15 and 16, which show a modified form of controller which may be substituted for the controller shown in Figs. 1 to 6. The air pressure tube 55 is connected to one side and the exhaust pipe 55$^a$ to the other side of a cylinder 56 fitted with a piston 57, which is reciprocated by the compressed air and provided with longitudinal ports 58 and 59. The port 58 is in continuous communication by a hole 60 with a longitudinal groove 61 formed upon the exterior of the piston. The groove 61 is open to the pipe 55, so that air under pressure is continuously admitted to the port 58 from the said tube. The port 59 is in continuous communication by a hole 63 with a slot 64 formed in the side of the cylinder 56, a plate 65 attached to the exhaust pipe 55$^a$ covering the slot 64. The port 59 is thus in continuous communication with the exhaust pipe 55$^a$. The port 58 is provided at its ends with internal valve seats 67 and 68 fitted with valves 69 and 70 secured upon one and the same spindle 71, and the port 59 is provided at its ends with external valve seats 73 and 74 fitted with valves 75 and 76 secured upon one and the same spindle 77. The spindles 71 and 77 extend beyond their valves sufficiently to contact with the covers 78 and 79 of the cylinder prior to buffers 80 and 81 striking the said covers. The air under pressure passes from the pipe 55 to the port 71 and when the valve 70 is open and the valve 69 closed, the air passes into the lower part of the cylinder. The pressure of air keeps the valve 74 upon its seat and the piston is forced upward in the direction shown by the arrow. The end of the spindle 71 strikes the cover 78 opening the valve 69 and closing the valve 70, thus preventing passage of air to the lower part of the cylinder and allowing compressed air to pass to the upper part of the cylinder. The spindle 77 will also have struck the cover 78 and closed the valve 75 and opened the valve 74. These positions of the valves are shown in Fig. 16. The pressure of air in the upper part of the cylinder forces the piston downward to the position shown in Fig. 16, the air below the piston exhausting through the valve 74 to the pipe 55ᵃ. The movement of the piston is reversed by the spindles striking the cover 79. The valves are operated sufficiently early to allow the compressed air to operate as a cushion at the termination of each stroke, the buffers 80 and 81 being introduced as a safeguard against accidental damage to the valves when the cylinder is empty of compressed air. The piston 57 is provided with a piston rod 85 to which is attached a slide valve 86 fitting a valve casing 87. This valve has a longitudinal groove 88 and a transverse port 89 communicating with the groove. The casing 87 is provided with a pipe 90 communicating with any source of air under suitable pressure, and corresponds to the pipe 1 in Fig. 1. A pipe 91 upon the said casing communicates with a vessel in which a vacuum is formed and corresponds to pipe 2 in Fig. 1. A pipe 92 leads to the pipe 30 of the teat cups, (see Fig. 11) and corresponds to pipe 25, an independent pipe not shown on the drawings being used in place of pipe 26. The groove 88 is in continuous communication with the pipe 92, and when the valve 86 is in the position shown in Fig. 15 compressed air passes from the pipe 90 through the transverse port 89 to the groove 88 and through the pipe 92 and the junction 27 and the nozzle 30 to the teat cups. During the descent of the said valve 86 by the action of the piston 57, the transverse port 89 opens communication between the pipe 92 and a port 94 formed in the casing and open to the atmosphere. The pressure in the teat cups is thus reduced to atmospheric pressure. The valve 86 continuing its descent to the position shown in Fig. 16, communication is established between the pipes 92 and 91 by the transverse port 89, and a vacuum is formed in the teat cups, thereby rapidly withdrawing the lining 34 from the teats, as previously described. The piston 57 then returns on its upstroke during which the port 89 admits air through the port 94 to the pipe 92, and destroying the vacuum, brings the air in the teats to atmospheric pressure. At the top of its stroke the valve 86 again admits air under pressure to the teat cups. The compressed air pipe 90 and the vacuum pipe 91 are thus respectively placed in communication with the pipe 92 when the teat cups are at atmospheric pressure. The said slot grooves and ports of course constitute air passages through the valve disk and between the tubes and other passages leading to the above mentioned teat-cups, the air supplying means and the air exhausting means, in order that the said teat-cups may be put into and out of communication with the former and the latter means in regular order according to the described operation of the machine.

What I do claim and desire to secure by Letters Patent of United States is:—

1. In apparatus for the purpose indicated, a teat cup comprising an outer casing, a flexible lining fitting the casing, a pouch surrounding the upper part of the flexible lining, and a nozzle attached to the casing and having a large passage for admission of air under pressure to the pouch and having a small hole for admitting air to the flexible lining and means for exhausting air from the teat-cups, substantially as set forth.

2. In apparatus for the purpose indicated, a teat cup comprising an outer casing, a flexible lining fitting the casing, a pouch surrounding the upper part of the flexible lining, a nozzle attached to the casing and having a small hole communicating with the flexible lining below the pouch, a single tube admitting air under pressure to the nozzle and means for exhausting the teat cups substantially as set forth.

3. In apparatus for the purpose indicated, a teat cup comprising an outer casing, a flexible lining fitting the casing, a pouch surrounding the upper part of the flexible lining, a nozzle attached to the casing and having a large passage communicating with said pouch and having a small hole communicating with the flexible lining below the pouch and a valve in the nozzle allowing the air to exhaust from the flexible lining through a port in the casing, substantially as set forth.

4. In apparatus for the purpose indicated, teat cups, a controller comprising a plate, air pressure supply and vacuum pipes connected to the plate, a disk having holes communicating with said pipes and having a port, a pipe forming a communication between the port and the teat cups, and a rotatable ported valve having a slot and groove whereby the port of the disk is brought alternately into communication with the air pressure supply pipes, the atmosphere, and the vacuum pipe, substantially as set forth.

5. In apparatus for the purpose indicated, a controller comprising a plate, air pressure supply and vacuum pipes connected to the plate, a disk having holes communicating with said pipes and having a port, a ported valve having a slot 24 and two grooves 15 and 19, a central spindle passing through the plate disk and valve and upon which the valve is rotatable, and means for rotating the valve, substantially as set forth.

6. In apparatus for the purpose indicated, a controller comprising a plate, air pressure supply and vacuum pipes connected to the plate, a disk having holes communicating with said pipes and having a port, a ported valve having a slot and two grooves arranged as stated, a forked spindle passing through the plate disk and valve and upon which the valve is rotatable a pin traversing the fork of the spindle, a keeper bearing upon the plate and passing into the fork of the spindle and engaging the pin thereof, a jaw projecting from the valve, a reciprocating shaft, and a detent fixed to the shaft and engaging the jaw, substantially as set forth.

7. In apparatus for the purpose indicated, teat cups, a controller comprising a plate, air pressure supply and vacuum pipes connected to the plate, a disk having holes communicating with said pipes and having a port, a ported valve having a slot and grooves, means for rotating the valve, and a pipe forming communication between the interior of the teat cups, and the hole in the disk leading from the vacuum pipe, substantially as set forth.

8. A disk-valve provided with a slot and with a pair of grooves curved concentrically with its upper side, said valve being also adapted to turn on its axis, in combination with parts in contact with the faces of said valve, means for exhausting air, means for supplying air under pressure, teat-cups of a milking machine, and means of communication between said valve and said air exhausting means, air supplying means and teat-cups respectively, the said grooves and slot being arranged to alternately open and close communication between said teat-cups and air supplying means and between said teat-cups and air exhausting means in regular succession as said valve turns on its axis substantially as set forth.

9. In combination with the teat-cups and air-exhausting devices of a milking machine and additional means for supplying air under pressure thereto, a disk valve adapted to turn on its axis, a part in contact with the upper face of, and fixed in relation to, said disk valve, means of communication between said valve and said air exhausting devices, said air supplying means and said teat-cups respectively, the said disk-valve being provided with a slot and a pair of grooves curved concentrically to its axis, the said grooves and slot being arranged to make connection between the said several means of communication in proper succession and to shut off such connections as needed.

In testimony whereof I have signed my name to this specification in the presence of two witnesses.

ROBERT ANDREW WIGGINS.

Witnesses:
R. FRASER,
A. ANDERSON.